Aug. 3, 1926.
D. E. HENNESSY
1,594,881
VULCANIZATION
Filed April 28, 1922
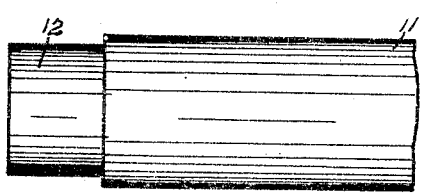
FIG.1
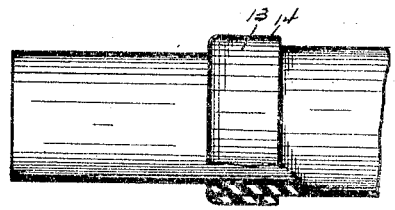
FIG.2
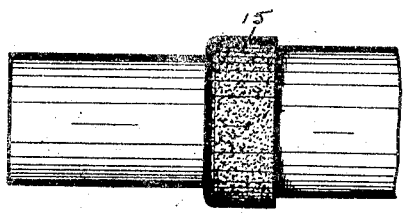
FIG.3
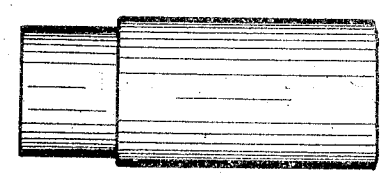
FIG.4
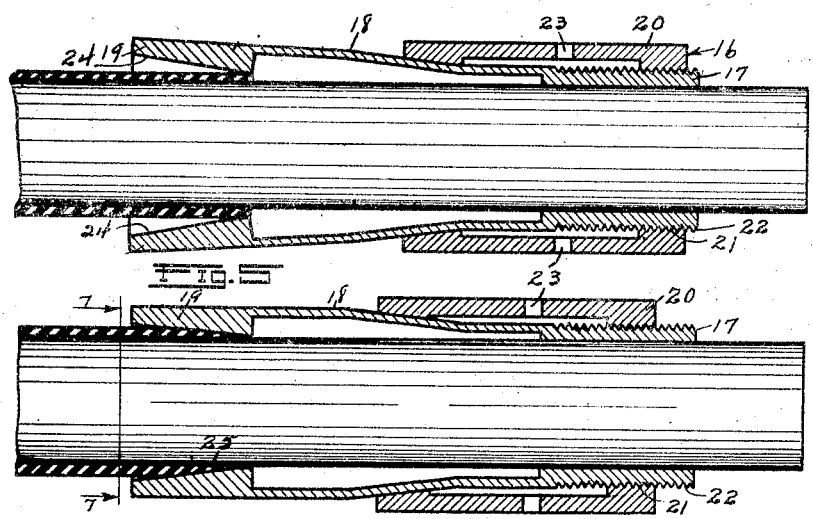
FIG.5
FIG.6
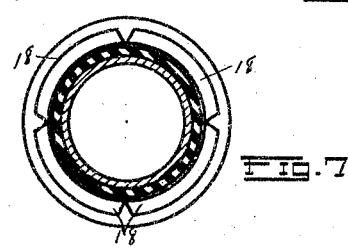
FIG.7
DANIEL E. HENNESSY
INVENTOR
BY Hadley Freeman
ATTORNEY Patented Aug. 3, 1926.

1,594,881

UNITED STATES PATENT OFFICE.

DANIEL E. HENNESSY, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

VULCANIZATION.

Application filed April 28, 1922. Serial No. 557,206.

In the manufacture of inner tubes it has been common practice to prevent blowing of the tube during vulcanization by confining the tube by means of a fabric wrapper applied thereto under tension. Because of the high rate of deterioration of such wrapper and the large amount of labor required to handle the wrapper, the cost of confining the tubes has been appreciable. My invention provides a method for curing inner tubes without such confining means and accordingly without the attendant expense. In the drawings accompanying this specification and forming a part thereof I have shown, for purposes of illustration, one form which my invention may assume. In these drawings:

Figure 1 shows an uncured inner tube positioned on a mandrel,

Figure 2 shows the tube turned back to expose a portion of the inner surface,

Figure 3 shows adhesive applied to this exposed portion,

Figure 4 shows the turned back portion replaced and lying against the mandrel,

Figure 5 shows a clamp about to be applied thereto,

Figure 6 shows this clamp applied, while

Figure 7 is a section on the line 7—7 of Figure 6.

In carrying out my invention according to the embodiment herein illustrated I form the inner tube 11 on the mandrel 12 as shown in Figure 1 and by any suitable method and then roll back the ends of the tube 11 to form cuffs 13 as shown in Figure 2. This exposes the inner surface of the tube at 14 and to these exposed portions of the inner surface I apply rubber cement as shown at 15 in Figure 3 and then replace the cuff against the tube as shown in Figure 4 whereupon the tube is joined to the pole at the ends by the applied cement 15.

In order to assist the cement 15 in maintaining a tight joint I then add a clamp which surrounds the end of the tube and clamps it fast to the mandrel. I find that it is convenient to so form this clamp that it will automatically produce a skived end on the tube. The clamp shown in Figures 5, 6, and 7 is suitable for the purpose.

This clamp 16 comprises a collar 17 adapted to be slipped onto the mandrel 12 and carrying four spring fingers 18 each bearing at its free end a clamping section 19 formed to engage one-fourth of the circumference of the tube 11. In order to increase the pressure of the sections 19 against the tube 11 I provide a ring 20 screw threaded at 21 to engage cooperating screw threads 22 on the exterior of the collar 17 so that rotation of the ring 20 by a tool engaging the apertures 23 therein will move it outward along the spring fingers 18 to thus increase the tension thereon and in this manner increase the pressure of the sections 19 against the tube 11 so that a tight seal will be maintained and during vulcanization the softened stock will be displaced to permit the sections 19 to seat as shown in Figure 6 whereupon the bevel faces 24 of the sections 19 will skive the ends of the tube as shown at 25. As clearly shown in Figure 7 the sections 19 of spring fingers 18 are provided with beveled edges which when the clamp is applied as shown in Figures 6 and 7 form cutting edges which substantially sever any excess of material which is forced outwardly between the sections by the clamping action. The seating of the sections 19 may be facilitated by heating the sections 19 or the entire clamp 16 before applying to thus preliminary soften the stock under the sections 19.

I find that in the above manner I can cure inner tubes without any wrapping. I find that it is possible to use the cement only or to use the clamp only and I find that when the clamp is used it is not necessary that it be pre-heated. I do find, however, that by pre-heating the clamp I may eliminate the ring 20 and its reinforcing action.

I have described herein one embodiment of my invention and indicated several modifications. This entire disclosure, however, is illustrative only and my invention is not limited thereto.

I claim:

1. A device of the character described comprising a plurality of fingers formed with inclined inner surfaces and beveled knife edges and means adapted to contract said fingers about the end of a raw rubber tube supported on a mandrel.

2. A device of the character described comprising a plurality of spring fingers, connected at their base, adapted to be positioned on the end of a mandrel, the free ends of said fingers being formed with inclined inner surfaces and beveled knife edges, and means to contract said fingers to clamp the end of a tube to the mandrel.

3. A device of the character described comprising a cylindrical member, adapted to be positioned on the end of a mandrel, spring fingers extending therefrom, and provided with inclined inner surfaces and beveled knife edges, and a cam element, supported by said cylindrical member, adapted to move said fingers into clamping engagement with the end of a tube positioned on the mandrel.

4. A device of the character described comprising an externally threaded cylindrical member, adapted to be positioned on the end of a mandrel, spring fingers extending from the member, the ends of the fingers being formed with inclined inner surfaces and beveled knife edges, and a cam element in threaded engagement with said cylindrical member, adapted to be advanced against the fingers to force the latter into clamping engagement with the end of a tube positioned on the mandrel.

5. A tube sealing clamp comprising a plurality of members presenting in their assembly a tapered bore adapted to seal and skive the end of a rubber tube against a mandrel, the mating edges of the members being relieved to permit the overflow of excess rubber, and means to compress the members into assembled position around a tube.

6. A tube sealing clamp having a contractible tapered bore terminating in an edge adapted to shear the tube to length, and means for contracting the clamp.

7. A tube sealing clamp comprising a plurality of members presenting together a tapered bore and having their outer surfaces shaped so as to form a cone of slight taper, and a ring having its inner surface tapered to fit the external surfaces of said members and adapted to force them into and hold them in contracted relation.

8. A tube clamping device having a skiving area adapted to produce the taper desired on the end of the tube, and a constricted portion adapted to shear the tube to length.

9. A beveling and sealing clamp for rubber tubes which comprises a device presenting a skiving surface to the rubber, and a separate means acting upon such device for causing the device to exert a steady compressive action on the rubber during vulcanization.

10. A beveling and sealing clamp for rubber tubes which comprises a contractible member having a tapered bore presenting a skiving surface to the rubber, said contractible member being split longitudinally, and a clamp constructed and arranged to contract the contractible member causing it to exert a steady compressive action on the rubber during vulcanization.

11. A tube sealing clamp consisting of two annular rings and a plurality of members movably held in one of said rings, the plurality of members presenting when assembled in abutting relation a tapered bore and an external surface in the form of a frustum of a cone of slight taper, the other annular ring having its inner surface tapered to fit the external surfaces of the said plurality of members and adapted to force them together and hold them in abutting relation.

12. A tube sealing clamp consisting of two annular rings and a plurality of members movably held in one of said rings, the plurality of members presenting when assembled in abutting relation a tapered bore and having their external surfaces shaped to form a frustum of a cone of slight taper, the other annular ring having its inner surface tapered to fit the external surfaces of the said plurality of members and adapted to force them together and hold them in closed relation, said plurality of members being suitably formed so as to retain the second mentioned ring.

13. A tube sealing clamp consisting of a plurality of members movably assembled to produce when in closed relation a tapered bore and having their external surfaces shaped to form a frustum of a cone of slight taper, and an annular ring having its inner surface tapered to fit the external surfaces of the said plurality of members and adapted to force them together and hold them in abutting relation.

14. A tube sealing clamp consisting of a plurality of members movably assembled to encircle a tube and to produce when in closed relation a tapered bore, means for holding said members normaly out of contact with the tube, and means for forcing said sections into compressive contact with the tube to exert a skiving pressure thereon.

15. A tube end clamp, adapted to encircle a tube, comprising a plurality of sections presenting in abutting relation a tapered bore terminating in a lip, said sections being externally tapered in the form of a frustum of a cone, means for holding said sections normally out of contact with the tube, and means for forcing said sections into compressive contact with the tube.

16. A tube end clamp having a plurality of members presenting when assembled in abutting relation a tapered bore, means for permanently holding said members assembled while permitting them to be closed into abutting relation or to be opened into expanded relation, and means for forcing said members together in abutting relation.

In testimony whereof I have signed my name to the above specification.

DANIEL E. HENNESSY.